US006195203B1

(12) United States Patent
Kadogawa

(10) Patent No.: US 6,195,203 B1
(45) Date of Patent: Feb. 27, 2001

(54) APPARATUS FOR DIRECT OPTICAL FIBER THROUGH-LENS ILLUMINATION OF MICROSCOPY OR OBSERVATIONAL OBJECTS

(75) Inventor: Hiroshi Kadogawa, Pasadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/393,067

(22) Filed: Sep. 1, 1999

(51) Int. Cl.[7] .............................. G02B 21/06; G02B 21/00
(52) U.S. Cl. ............................................. 359/385; 359/368
(58) Field of Search ................................. 359/368, 385, 359/387, 388, 390

(56) References Cited

U.S. PATENT DOCUMENTS

| | | |
|---|---|---|
| 3,776,614 | 12/1973 | Kloots et al. . |
| 4,236,781 | 12/1980 | Arimura . |
| 4,251,128 | 2/1981 | Feinbloom . |
| 4,291,938 * | 9/1981 | Wagner ............................ 359/387 |
| 4,329,015 | 5/1982 | Feinbloom . |
| 4,527,870 | 7/1985 | Esmay . |
| 4,537,477 | 8/1985 | Takagi et al. . |
| 4,617,467 * | 10/1986 | Senftle et al. .................. 250/461.1 |
| 4,725,727 | 2/1988 | Harder et al. ....................... 250/227 |
| 4,756,611 | 7/1988 | Yonekubo et al. . |
| 4,779,967 * | 10/1988 | Murphy et al. ..................... 359/379 |
| 4,998,810 | 3/1991 | Sander et al. . |
| 5,312,393 * | 5/1994 | Mastel ................................... 606/4 |
| 5,323,009 | 6/1994 | Harris ............................... 250/458.1 |
| 5,548,113 * | 8/1996 | Goldberg et al. .................... 250/234 |

FOREIGN PATENT DOCUMENTS 63-191114    8/1988   (JP) .

OTHER PUBLICATIONS

Jenkins, Francis, A. and White, Harvey E., "Fundamentals of Optics," McGraw–Hill, Inc., US, 1937, pp. 200–202.
Kingslake, Rudolf, "Optical System Design," Academic Press, Inc., Orlando, Florida, 1983, pp. 187–193.
Smith, Warren J., "Modern Optical Engineering—The Design of Optical Systems," McGraw–Hill, Inc., USA, 1990, p. 253.

* cited by examiner

Primary Examiner—Thong Nguyen
Assistant Examiner—Mark A. Robinson
(74) Attorney, Agent, or Firm—John H. Kusmiss

(57) ABSTRACT

In one embodiment of the invention, a microscope or other observational apparatus, comprises a hollow tube, a lens mounted to the tube, a light source and at least one flexible optical fiber having an input end and an output end. The input end is positioned to receive light from the light source, and the output end is positioned within the tube so as to directly project light along a straight path to the lens to illuminate an object to be viewed. The path of projected light is uninterrupted and free of light deflecting elements. By passing the light through the lens, the light can be diffused or otherwise defocused to provide more uniform illumination across the surface of the object, increasing the quality of the image of the object seen by the viewer. The direct undeflected and uninterrupted projection of light, without change of direction, eliminates the need for light-deflecting elements, such as beam-splitters, mirrors, prisms, or the like, to direct the projected light towards the object.

25 Claims, 3 Drawing Sheets

APPARATUS FOR DIRECT OPTICAL FIBER THROUGH-LENS ILLUMINATION OF MICROSCOPY OR OBSERVATIONAL OBJECTS

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

In order to adequately view an object by a magnifying device such as a microscope, it is very important to sufficiently illuminate the viewed object. Generally, as the magnification is increased, more light must be projected onto the object. A lack of sufficient illumination will make the object at least difficult, if not impossible, to observe. However, applying light to the object must be done in a manner which does not substantially affect the observation of the object. That is, the process of adding additional light may actually interfere with or obscure the user's ability to clearly observe the object.

One of the most common means to light an object is to back-light it. As the name implies, back-lighting simply involves placing a light source behind the object such that the light passes from its source through the object and then into the microscope. However, when viewing substantially or completely opaque objects, the light must be applied to the surface(s) being observed. Typically, opaque objects are simply lit from a source positioned at the side of and somewhat back from the object. This method of lighting is normally referred to as "side illumination".

An inherent problem with side illumination is that as the degree of magnification increases, the lighting becomes less and less sufficient. This results from the fact that as the magnification increases the distance from the objective lens to the object decreases. This distance is known as the 'working distance'. High power microscopes generally have working distances on the order of a tenth of a millimeter or smaller. At such small distances, little light can be projected from the side of the microscope onto the surface of the object. Further, the light which does reach the object will be directed very nearly parallel to the plane of the object's surface, causing unwanted shadows and distortions. This is especially problematic when the surface is not (relatively) smooth.

An alternative to side illumination is vertical illumination. With vertical illumination light is transmitted from behind and through the microscope's objective lens onto the object. This requires that light be projected from within the microscope itself. After reaching the surface of the viewed object, the light reflects off the surface and some of it travels back up through the objective and eyepiece lenses to viewer. The amount of light returning to the microscope depends on the reflectiveness of the object's surface.

If light is projected from within the microscope itself steps must be taken to avoid interference with viewing the object. Perhaps the most common type of vertical illuminator attempts to avoid interference by positioning its light source off to a side of the microscope tube and using a beam-splitter to direct the projected light down through the objective lens and onto the object. That is, the light source is positioned off to the side of the tube and transmits its light roughly perpendicular to the axis of the microscope, through an opening in the side of the tube between the objective and eyepiece lenses. A beam-splitter is placed about the microscope's optical axis at generally a 45 degree angle so to direct the light towards the objective lens, generally parallel with the microscope's axis. The beam-splitter is typically a partially silvered piece of glass which allows about half the light to pass directly through and reflects the remaining light. When the light is traveling back up through the microscope, from the objective lens towards the viewer, the beam-splitter again allows only amount half the light to pass through to the viewer and reflects back towards the light source the remaining light.

Therefore, at best with a beam-splitter, the microscope only allows about a quarter of the light emitted by the lamp to reach the viewer. The stray light which is diverted by the beam-splitter must be controlled to prevent interference with the viewer's image. To overcome these reductions in light, an intense light source may be required. Of course, increasing the size of the light source increases the cost and the heat produced. Another problem with using a beam-splitter to direct the projected light is that any defects or aberrations present in the beam-splitter will affect the quality of the viewer's image. Of course, the defects and aberrations can be minimized by precision fabrication, which also increases costs. Thus, the use of beam-splitters to direct light presents some significant problems.

In other vertical illuminator designs, mirrors and/or prisms are used in place of beam-splitters to direct the light projected from the light source. Although these elements tend to project more of the light they direct, they (and their associated supporting structures) act to block some of the light returning from the objective to the viewer. These elements must be positioned with the defocused region existing behind the objective lens to avoid inference with the image of the object. Even so positioned, the blocking of light will reduce the brightness of the object image. The larger the mirror or prism, the greater the decrease in illumination will be. Thus, the use of a mirror or a prism does little to overcome the problems associated with the prior devices.

Further problems exist as beam-splitters, mirrors and prisms are all inherently difficult to adjust to obtain proper directing of the projected light. Adjustment may be critical to the operation of the microscope not only to adequately light the object, but also to avoid interference caused by projected light reflecting off the back surface of the objective lens and returning to the viewer. Some prior devices employing mirrors to direct the projected light have had to resort to tilting the objective lens to avoid reflections. Obviously, such a complicated modification is undesired as it prevents the use of the illuminator in commercial microscopes with interchangeable objective lenses of varying powers.

A further problem is that the addition of beam-splitters, mirrors, and/or prisms and their supporting structures, increases cost, size, weight and complexity. They make the microscopes more fragile and susceptible to misalignments. Also, the inclusion of the additional components can present problems when the microscope is used in unique applications such as within a vacuum, where all components must be specifically prepared to prevent out-gassing from certain materials or trapped air.

Thus, a device is sought which will direct light in a manner that provides sufficient illumination of the viewed object without substantially blocking, reducing and/or distorting the light traveling back up through the microscope to the viewer. In so doing the device should use the smallest necessary light source to reduce cost and complexity. The device must be easy to adjust to prevent unwanted reflections causing light interference at the eyepiece. The device must also be compatible and easily integrated into existing commercial microscopes having interchangeable objective lenses of varying degrees of magnification. Further, the device must be capable of operating in specialized environments such as vacuums with minimal out-gassing. The device must also be sturdy, durable and relatively low in complexity, cost and weight.

SUMMARY OF THE INVENTION

In a microscope embodying the present invention the output end of an optical fiber is oriented so as to directly project light along a straight line through an objective lens directly to the object being viewed. By passing the light through the objective lens, the light can be diffused or otherwise defocused to provide more uniform illumination across the surface of the object, increasing the quality of the image of the object seen by the viewer. The direct undeflected and uninterrupted projection of light, without change of direction, eliminates the need for light deflecting elements, such as beam-splitters, mirrors, prisms or the like, to direct the projected light towards the object. Thus, the light path from the lens to the object is uninterrupted by any light deflecting elements. Being able to eliminate these light deflecting elements produces great advantages such as reductions in cost, weight and complexity as well as increases in durability and ruggedness, and allows the invention to be used in conventional microscopes with minimal or no modification.

Preferably, the optical fiber is flexible so that it is easily bent to direct its output end towards the object without having to move the input end.

By directly projecting the light, significantly less light is lost to the losses or deflections of light typically occurring with devices utilizing beam-splitters, mirrors and/or prisms. This direct lossless light projection allows the use of the smallest necessary light source (again reducing cost, weight and complexity), greatly reduces the introduction of stray light which may interfere with the imaging of the viewed object, and minimizes reductions in illumination caused by the blocking of returning light by the deflecting elements themselves. The fact that no deflecting elements are needed and that the output end can be positioned close to the objective lens, and thus the object itself, allows the use of less expensive optical fibers (e.g. multi-mode optical fibers) which tend to have wider conical light projection than the more expensive optical fibers. The elimination of elements (e.g. beam-splitters) being placed across the path of the returning object image also removes distortions imparted by these elements. Further, the present invention is much easier to adjust and align the projected light than are beam-splitters, mirrors and/or prisms. Because of its limited number of components, the present invention can be configured to operate in specialized environments such as a vacuum.

Placing the output within the defocused region of the objective lens provides diffused illumination across the surface of the object which improves viewing of the object. The lens can be sized, shaped and mounted to the tube in order to allow the viewer to view the object through the lens and the tube. As such, the lens operates to both diffuse light projected from behind and through the lens onto the object and to provide for observation of the viewed object.

The lens can also be configured (sized and shaped) and mounted to the tube to produce a magnified image of the object for viewing by the viewer. To obtain additional magnification the apparatus can also be configured as a compound microscope. That is, the lens can be configured to produce a focused magnified internal image within the tube. Then added to the apparatus is an eyepiece lens configured and mounted to the tube to produce a further magnified image of the internal image.

The optical fiber can enter the apparatus at any convenient location which allows the output end to be positioned to project light through the objective lens and onto the object. It is preferred that the optical fiber simply enter though a port in the side of the tube such that the output end will be within the defocused region and near or at the pupil plane of the objective lens. This provides that the light projected onto the object is diffused by the objective lens. In such a case, the fiber enters the tube transversely and is bent inside the tube so that the output end points longitudinally relative to the tube and at the object. Preferably, the output end is orientated such that the light beam produced at the output end, after passing through objective lens, illuminates the entire viewed object surface.

The objective lens is mounted to the lower end of the hollow tube, near the object. The eyepiece lens in turn is mounted on the upper end of the hollow tube such that it can magnify the internal image produced by the objective lens for viewing by the viewer.

The optical fiber can be held in position within the apparatus by an adjustable support. This support is in turn attached to the apparatus (e.g. to the tube). This allows the position of the output end of the optical fiber to be varied. The adjustable support can be a fixed or deformable material.

The objective lens can be contained in a microscope objective which is a housing attached to the lower end of the tube. The microscope objective can be detachable to allow different lenses of various magnifications to be used. The output end of the optical fiber should be positioned such that the light it projects continues to pass through the objective lens and is diffused on the object. The microscope objective can be configured such that optical fiber passes into the apparatus at the microscope objective and not through the tube or any other portion of the apparatus. In such a configuration the optical fiber must be mounted to the microscope objective so that the output end is positioned to project light through the objective lens and onto the object. With the microscope objective so configured, the optical fiber can have a separating plug positioned at or near the location where the optical fiber passes though the microscope objective. The exterior portion of the optical fiber may be separated from the microscope objective to allow easy attachment and detachment (e.g. screw on or screw off) of the microscope objective, allowing use of a variety of microscope objectives each containing different lenses, to change the microscope's magnification, and which each contain their own optical fibers for illumination.

DETAILED DESCRIPTION OF THE PREFERRED EMBODIMENTS

In the preferred embodiment the invention is in a microscope where the output end of an optical fiber is oriented so as to directly project light along a straight path to an objective lens and then onto the object being viewed. By passing the light through the objective lens, the light can be diffused or otherwise defocused to provide more uniform illumination across the surface of the object, increasing the quality of the image of the object seen by the viewer. The direct undeflected projection of the light, without change of direction, eliminates the need for optical deflecting elements, such as beam-splitters, mirrors, prisms or the like, to direct the projected light towards the object. Thus, the light path from the lens to the object is uninterrupted by any light-deflecting elements. Being able to eliminate these light-deflecting elements produces great advantages such as reductions in cost, weight and complexity as well as increases in durability and ruggedness, and allows the invention to be used in conventional microscopes with minimal or no modification.

Figure 1:
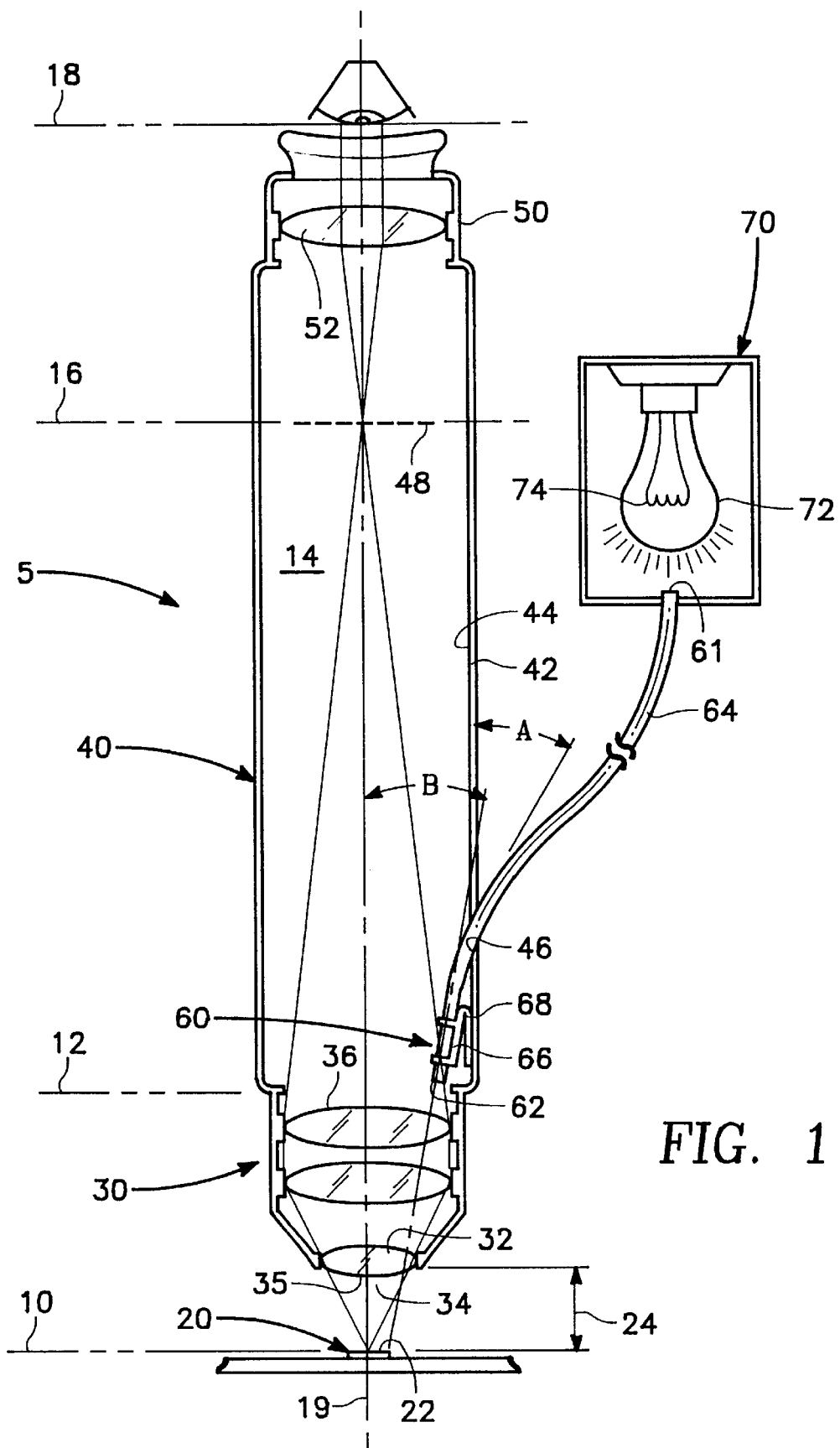
FIG. 1 is a cross-sectional side view of an embodiment of the present invention.

As seen in FIG. 1, the microscope 5 is used to allow the user to see a magnified image of an object 20. The microscope 5 includes the following primary components: a microscope objective 30, a microscope tube 40, an eyepiece 50, an optical fiber illuminator 60 and a light source 70. Each of these primary elements and their sub-elements are described in detail herein.

Several planes are important to the configuration and operation of the microscope 5. These include an object plane 10, a pupil plane 12, an intermediate focal plane 16 and an exit pupil plane 18, as shown in FIG. 1. The object plane 10 is set at the position of the surface of the object being viewed. The pupil plane 12 is set at the back of the microscope objective 30. Typically, the optical fiber illuminator 60 is positioned at or near (behind) the pupil plane 12. The intermediate focal plane 16 is set back from the pupil plane 12 and typically within the microscope tube 40. The intermediate focal plane 16 is the position where the microscope objective 30 focuses an internal image 48 of the object 20 magnified to a certain degree. Set between the pupil plane 12 and the intermediate focal plane 16 is the defocused region 14. In the defocused region 14 the image of the object 20 is out of focus to a certain degree. The amount which the image of object 20 is out of focus depends directly upon the particular position within the defocused region 14. The further forward from the intermediate focal plane 16 within the defocused region 14, the more out of focus the image becomes. Likewise, if a focused image, such as a point light source, is projected from within the defocused area towards and through the lenses in the microscope objective 30, its image at the object plane 10 will be out of focus. Typically, the defocused region 14 is set within the length of the microscope tube 40. The exit pupil plane 18 represents the location of the eye of the viewer. The microscope 5 also has an optical axis 19 which typically runs along the center of the microscope objective 30, the microscope tube 40, and the eyepiece 50.

As shown in FIG. 1, microscope 5 views an object 20 which has an object surface 22 and which is positioned at object plane 10. The distance from the vertex of the front lens of the microscope to the object 20 is the working distance 24. The length of working distance 24 generally depends upon the magnification of microscope 5. Typically the higher the magnification, the shorter the distance between the lens and the object 20. With some high-power lenses this distance is on the order of a few tenths of a millimeter.

The microscope objective 30 includes objective lens 32 and has an objective front 34 and an objective rear 36. These elements are shown in FIG. 1. The objective lens 32 operates to form at intermediate focal plane 16 a magnified aerial (internal) image 48 of the object 20. The image 48 is then magnified further by the eyepiece 50 for viewing by the user. The overall magnification of the microscope is the product of the magnification of the microscope objective 30 and the eyepiece 50. Typically, a microscope will have a set of interchangeable microscope objectives, so as to allow the magnification of the microscope to be changed. Interchangeable microscope objectives must have a common mount so that each microscope objective can be received by and attached to the microscope tube 40. Also, the microscope objectives must each position and/or shape their respective lens or lenses (along optical axis 19) such that the internal image 48 produced by each microscope objective 30 remains at the intermediate focal plane 16. In this manner, the eyepiece 50 or its lens 52 does not have to be repositioned or otherwise modified to operate with different microscope objectives.

The microscope objective 30 and objective lens 32 are situated about the optical axis 19 such that the centerline of objective lens 32 is aligned with the lens of the eyepiece 50. Although the microscope objective 30 can comprise just a single objective lens 32, typically the microscope objective 30 will contain a combination of several lenses. The objective front 34 is the surface of the lens at the front of the microscope 5, that is, the lens which is positioned closest to the object 20. Where the front objective lens intersects with the optical axis 19 is a front objective lens vertex 35. The objective rear 36 is the portion of the microscope objective 30 at or near the connection of the microscope objective 30 to the microscope tube 40. The working distance 24 is the length from the front objective lens vertex 35 to the object 20.

Microscope tube 40 has a tube side wall 42, a tube interior wall 44 and a port 46, as shown in FIG. 1. The tube side wall 42 defines the internal space which the observed image is projected through by the microscope objective 30. When necessary to prevent the introduction of stray light into the microscope 5, the tube side wall 42 must be a continuous opaque material. The interior of the tube side wall is the tube interior wall 44.

The port 46 is positioned and sized in the tube side wall 42 to allow an optical fiber 64 to pass through the side wall. The size of port 46 should be close to the diameter of the optical fiber 64 so as to prevent transmittal of stray light from outside the microscope 5. Although the port 46 can be of any size, in one embodiment the diameter of port 46 was set at 0.060 inches. To prevent stray light from entering the microscope tube 40 at the port 46, a grommet of any opaque material can be used to fit between the port 46 and the optical fiber 64. Because the optical fiber 64 is limited in the radius of any curvature imparted to it and typically must be bent in order to aim the output end 62 towards the objective lens 32, it is preferred that port 46 pass through the tube side wall 42 at a port angle A relative to the surface of the tube side wall 42. The port angle A can be any angle. However, the specific value of port angle A depends on such factors as the positioning of the output of the optical fiber, the location of the port 46 along the length of the side wall 42, the amount which the optical fiber 64 is curved, and the like. In one embodiment the port angle A was set at 20 degrees, however, it is preferred that the port angle A be set so optical fiber 64 passes through tube side wall 42 nearly parallel with the optical axis 19, such as with port angle A set at 10 degrees or less.

Although it is preferred that just one port 46 be used to allow passage of a single optical fiber 64, if the use requires additional light to be projected onto object 20, the port 46 could be made wider to accept more than one optical fiber 64. More than one port 46 could be used.

Within tube 40, objective lens 32 projects an internal image 48. The internal image 48 is a focused, magnified and inverted image of object 20. The internal image 48 is located at the microscope's intermediate focal plane 16.

The eyepiece 50 operates to further magnify the internal image 48 of the object 20. This magnification occurs by use of an eyepiece lens 52. Eyepiece lens 52 can be a single lens or a group of lenses. The eyepiece lens 52 must be sized, shaped and positioned such that it acts to magnify the internal image 48 of the object 20 so that the resulting image at the exit pupil plane 18 is magnified and can be viewed by the user.

The optical fiber illuminator 60 operates to transfer light from a remote light source 70 to the interior of the microscope 5. This is shown in FIG. 1. By projecting light from within the microscope towards the objective lens 32, the illuminator 60 causes light to pass through the objective lens 32 and be projected onto the object 20. Then, depending on the reflectiveness of the object surface 22, a certain amount of the light projected onto object 20 will reflect off the object and pass back through the microscope 5 and to the user. The illumination of object 20 caused by the illuminator 60 will brighten the image seen by the user, allowing for improved observation.

The optical fiber illuminator 60 includes an optical fiber input 61, an optical fiber output 62, an optical fiber 64 and a support clip 66, as shown in FIG. 1.

The optical fiber 64 operates to transfer light from a remote source to the interior of the microscope 5. The optical fiber 64 can vary in length and diameter depending on the specific needs of the use for which illuminator will be employed. For example, if the use requires more light to be projected onto to the object surface 22 (e.g. because the surface reflects little light), then a large diameter optical fiber 64 can be used. However, since a large diameter optical fiber 64 may (depending on positioning) block some of the returning light, it is preferred that the diameter be kept closer to the minimum needed to transmit the amount of light required. One end of the optical fiber 64 with the optical fiber input 61 is attached to the light source 70. The optical fiber input 61 is aimed towards the light source 70 so as to pick up light to be transferred to the output end of the optical fiber 64. In the preferred embodiment, the optical fiber 64 runs from the light source 70 through the microscope tube side wall 42 via the port 46 set in the microscope tube side wall 42. The optical fiber 64 terminates within microscope 5 at the optical fiber output 62.

At the optical fiber output 62 the light transferred by the optical fiber 64 is projected. The angle of the output light beam relative to optical axis 19 is an optical fiber output angle B. With the output 62 directly aligned with the optical axis 19, the output angle B will be 0°. It is preferred that the optical fiber 64 be positioned off to one side of the interior of the tube 40, near interior wall 44. With the optical fiber 64 so positioned, output 62 may have to be set at some output angle B to provide sufficient illumination of the object 20 and to avoid reflecting light off the back surface of the objective lens 32. Positioning the optical fiber 64 to one side of the microscope tube 40 reduces blocking of light reflected off the object 20 and traveling back through the microscope 5 to the user.

The fact that the output 62 can be orientated directly towards object 20 (no deflecting elements needed), and that output 62 can be placed relatively close to objective lens 32 (thus to object 20), allows a variety of different types of optical fibers to be used in the present invention. That is, the optical fiber 64 is not limited to single-mode fibers which provide narrow conical light beam projection. Instead, the optical fiber 64 can be a multi-mode optical fiber, which provides more light output and a wider conical projection of light. This is a significant advantage as multi-mode optical fibers tend to be significantly less expensive then single-mode optical fibers. This in turn reduces the costs of the optical fiber 64 and of the microscope 5 or other device incorporating the present invention. If more than one optical fiber 64 is needed, they can be attached to a single clip 66 or more than one clip 66 can be used.

The optical fiber 64 may be held in position within the microscope 5 by the support clip 66. In one embodiment, the support clip 66 is affixed between the microscope interior wall 44 and the optical fiber 64 near its output 62, such that the output 64 is held at or near the pupil plane 12. The support clip 66 is attached to tube side wall 44 at a support clip mount 68. The mount 68 includes two screws which pass through holes in the clip 66 and into holes in side wall 44. The support clip 66 can be made of any suitable material which secures the optical fiber 64 in place. It is preferred that the clip 66 be made of a material that will retain the optical fiber 64 in a relatively fixed position within the microscope tube 40. However, in one embodiment the support clip 66 is made of relatively thin and/or flexible material, such as aluminum, to allow the clip 66 to be deformed to allow some adjustment to the position and/or angle of the optical fiber output 62. This adjustment can be made either internally or externally. For an internal adjustment with the clip 66 as shown in FIG. 1, the microscope objective can be removed and the optical fiber 64 and clip 66 adjusted directly.

Figure 4:
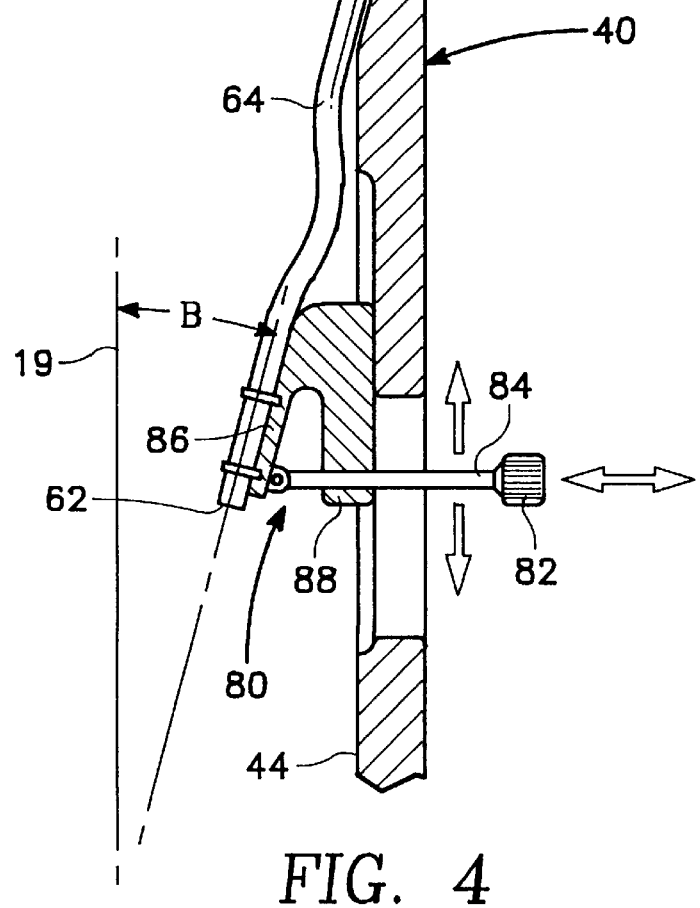
FIG. 4 is a cross-sectional side view of an embodiment of the illuminator of the present invention.

For external adjustment, as shown in FIG. 4, in one embodiment of the present invention, the optical fiber is supported by an adjuster 80. As shown in FIG. 4, the adjuster 80 supports the optical fiber 64 and allows both the output angle B and the position of the optical fiber 64 to be changed by external manipulation by the user. Adjuster 80 has an adjustment knob 82, an adjustment arm 84, an adjuster support clip 86 and an adjuster mount 88. The adjustment knob 82 is positioned and shaped to allow the user to manipulate it to change the position of the optical fiber 64. The adjustment arm 84 is mounted to the support clip 86. Support clip 86 is made of a flexible material to allow the support clip 86 to be deformed and the angle B varied as the adjustment arm 84 is slid into or out of the microscope tube 40 by the user. That is, as the adjustment arm 84 is pushed inward the support clip 86 is bent outward and the angle B is increased. Likewise, as the adjustment arm is pulled outward, the support clip 86 is bent inward and the output angle B is decreased. Mount 88 is slidably attached to the microscope interior wall 44 allowing the mount 88 to move vertically in the microscope tube 40. With the optical fiber 64 attached to the support clip 86, the movement of the base 88 causes the optical fiber 64 to move vertically within the tube 40. The mount 88 can be slid by the adjustment arm 84 which is in contact with the mount 88. As the adjustment arm 84 is slid upwards, the mount 88, support clip 86, and optical fiber 64 move upwards. When the adjustment arm 84 is moved downward, the mount 88, support clip 86, and the optical fiber 64 are also moved downward.

The amount of change in the angle B and the distance which the optical fiber can be moved along the microscope tube 40 can vary depending on the specific embodiment's needs. The adjustment arm 84 can be of a variety of configurations including having a screw shape which is received by the mount 88 to allow for fine and retained changes to the angle B by rotation of adjustment arm 84 by adjustment knob 82. In such an embodiment of the adjuster 80, the support clip 86 could be made of a relatively inflexible material if it is hinged at the mount 88. The adjuster 80 allows the position of the optical fiber 64 to be changed to accommodate different microscope objectives 30 or other changes to the configuration of the microscope 5.

In an alternative embodiment, support clip 66 can be configured as a hollow tube, having the optical fiber 64 running along the tube's interior. The support tube can be made of a flexible material, such as a deformable metal, to allow adjustment of the optical fiber 64 and its output 62. The support tube can be mounted to the tube side wall 42 by being received by the port 64.

Although the illuminator 60 can be placed in any position along the interior of the microscope which allows for projection of light so as to illuminate the object 20, it is preferred that the illuminator 60 be positioned such that its output 62 is placed within the defocused region 14 and specifically near or at the pupil plane 12. Placing the optical fiber output 62 in the defocused region 14 allows the light projected from output 62 to be diffused by the objective lens 32. That is, the image of the output 62 is out of focus when it is projected onto the object 20. The resulting projected diffused light provides more even and constant illumination across the object surface 22, improving the image seen by the viewer. Placing the output 62 at or near the pupil plane 12 is preferred as this location tends to provide the most diffusion of the projected light.

Another advantage to placing the optical fiber output 62 in the defocused region 14 is that the optical fiber 64 and the support clip 66 will not be seen as a visible image by the viewer. That is, even though the optical fiber 64 and clip 66 may be positioned within the path of the light traveling through the microscope 5 from the object 20 to the viewer, at the position of the optical fiber 64 and clip 66, the image of the object 20 will be defocused and thus the image will not be interfered with by the optical fiber 64 and clip 66.

Although the optical fiber output 62 can be set at an angle B from the optical axis 19, it is preferred that the optical fiber output 62 be substantially aligned with axis 19 to maximize the light projected onto object 20 and to minimize the transmission of stray light within the microscope 5. Similarly, depending on the location of the output 62, it is preferred that the output 62 be set at an angle B which minimizes or eliminates light reflected off the back of objective lens 32. Of course, reducing or eliminating inference caused by any such reflected light will improve the viewer's image of the object 20. Although the output 62 can be positioned at roughly any position across the interior of the microscope 5 (e.g. in a plane aligned with the optical axis 19), it is preferred that the output 62 be positioned near the tube interior wall 42. The closer to the interior wall 42, the less the optical fiber 64 and it support clip 66 will block light returning from the object 20 to the viewer.

Figure 3:
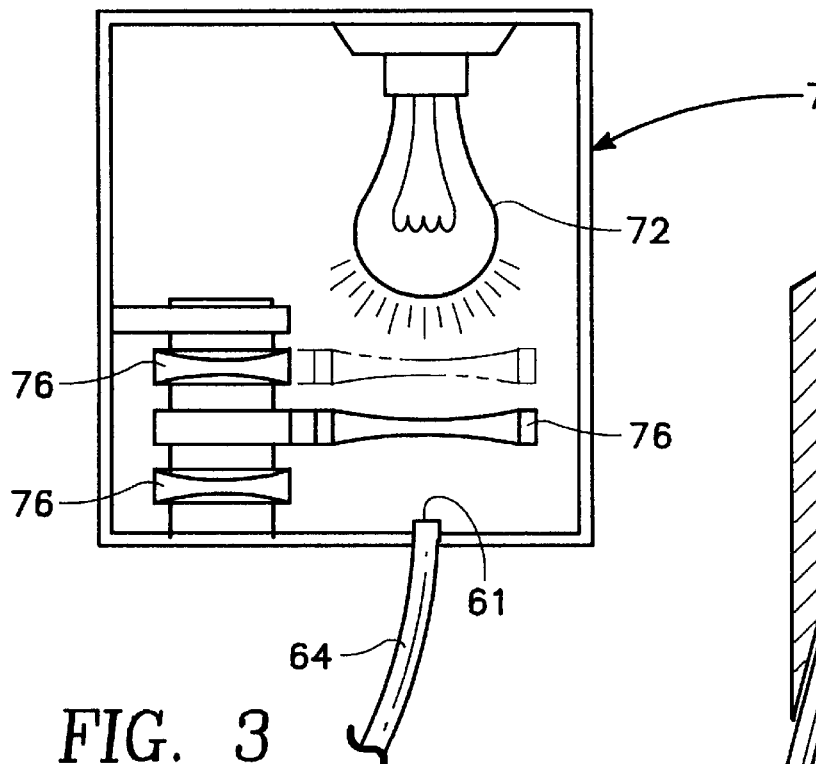
FIG. 3 is a cross-sectional side view of an embodiment of the light source of the present invention.

As shown in FIG. 1, the light source 70 includes a lamp 72 positioned within an enclosure 76 which accepts the end of optical fiber 64 having the optical fiber input 61, such that the input 61 is aimed so as to receive light from the lamp 72. Although a variety of lamps can be used, typically lamp 72 will be a bulb with a lamp filament 74. Although the preferred embodiment employs a lamp as light source 70, alternatively light source 70 can include any light emitting element such as a laser illuminator, a laser diode or a light-emitting diode. Also, light source 70 can be capable of emitting light over a broad spectrum of light, including visible light and/or infrared light. In one embodiment, the light source 70 can include optical filters 76 which can be moved into a position between the lamp 72 and the input 61 as is shown in FIG. 3. The optical filters 76 act to allow only a select range of wavelengths of light to pass through into the optical fiber 64. As can be seen in FIG. 3, the light source 70 can include a set of separate individual optical filters 76. In such an embodiment, each filter can be set to allow transmission of a different range of wavelengths of light. This provides the microscope operator with great versatility as he or she can project onto the object surface 22 different types of light as necessary for the particular application. In one embodiment, the first optical filter below the lamp 72 can be a heat rejection filter and below the heat rejection filter can be positioned a color filter. In this embodiment the heat rejection filter acts to protect the color filter from the heat produced by the lamp 72.

As shown in FIG. 3, when in use the optical filters 76 can be moved into place in the light path between the lamp 72 and the optical fiber input 61. When not in use, the optical filters 76 can be moved to one side, out of the path of light.

The distance which the light source 70 can be located away from the microscope 5 depends upon several factors such as the amount of light needed to be projected onto the object, the power of the lamp 72 and the type and diameter of the optical fiber used.

Figure 2:
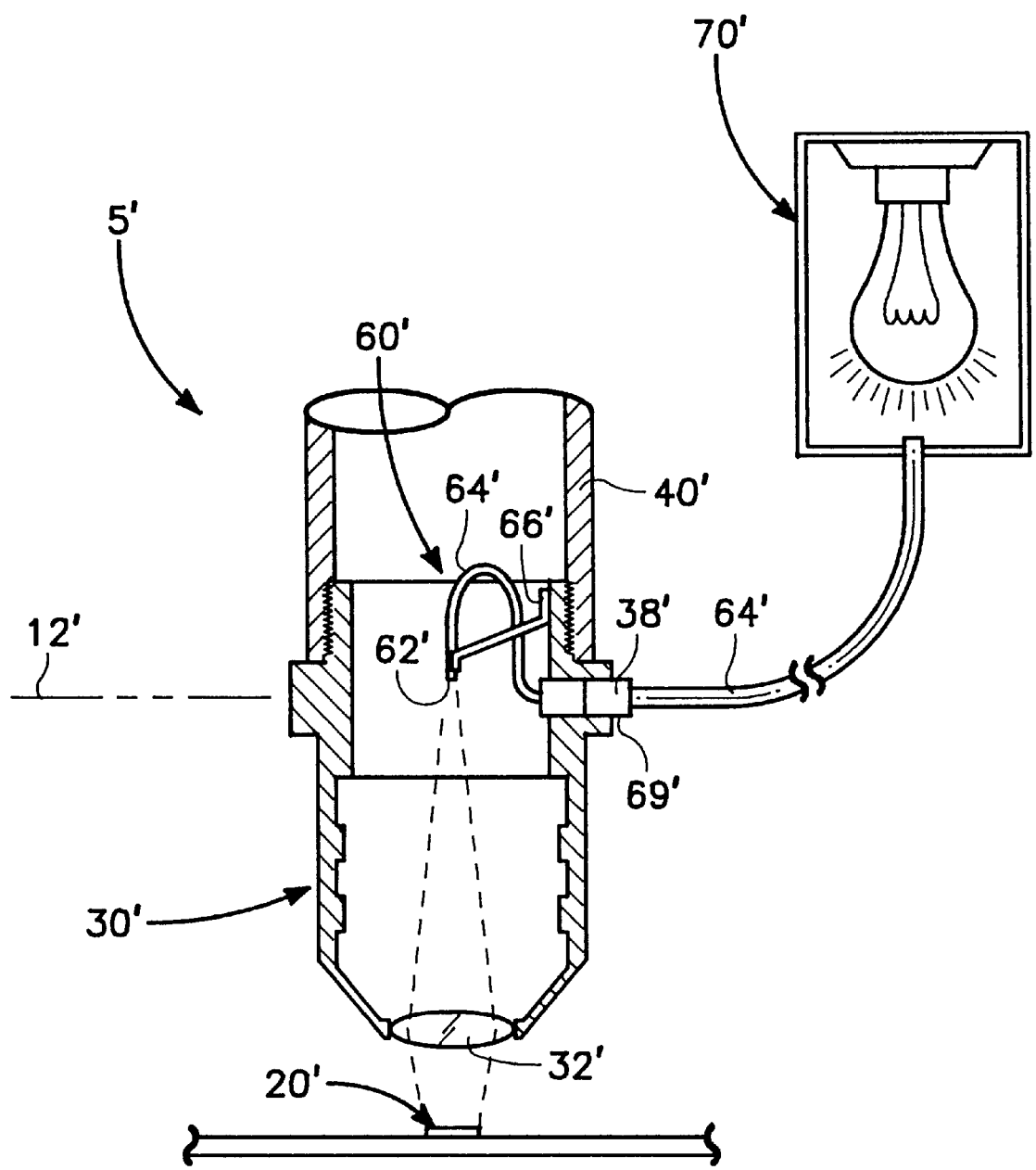
FIG. 2 is a cross-sectional side view of an alternative embodiment of the present invention.

An alternative embodiment of the present invention is shown in FIG. 2. In this embodiment, the optical fiber illuminator 60' is attached solely to a detachable microscope objective 30' and not to the microscope tube 40'. This arrangement of elements allows the illuminator to be used with any standard microscope without any modification to the tube or similar portion of the microscope. That is, a port for the optical fiber does not need to be made in the side wall of the microscope 5'. In this embodiment, the optical fiber 64' runs from the light source 70' through a port 38' in the side of the microscope objective 30'. The optical fiber 64' is bent such that the optical fiber output 62' is aimed towards the objective lens 32' while being positioned at or near the pupil plane 12'. The optical fiber 64' is held in place within the microscope objective 30' by a support clip 66' mounted to the microscope objective 30'. In this configuration, light is projected from the optical fiber output 62' through the objective lens(es) 32' onto the object 20'. Since the output 62' is positioned within the defocused area of the microscope, the light projected onto the object 20' will be diffused. The microscope objective 30' and optical fiber 64' can also be configured so that an optical fiber plug 69' is located at the port 38'. This is shown in FIG. 2. The optical fiber plug 69' allows the optical fiber 64' to be detached at the microscope objective 30', which provides for easier screw-on attachment of the microscope objective 30' to the microscope tube 40'. Thus, an advantage to these alternative configurations is that the microscope objective 30' can replace any standard (commercially available) microscope objective.

While the invention has been described in detail by specific reference to preferred embodiments, it is understood that variations and modifications thereof may be made without departing from the true spirit and scope of the invention.

What is claimed is:

1. An apparatus for viewing an object by a viewer comprising:
   A. a hollow tube;
   B. a lens mounted to the tube;
   C. a light source; and
   D. at least one optical fiber having an input end and an output end, the input end positioned to receive light from the light source, and the output end positioned within the tube so as to directly project light along a straight path to the lens to illuminate the object, such that the path of projected light is uninterrupted and free of light-deflecting elements, wherein the output end is positioned relative to the lens such that light projected onto the object by the output end is not focused, so as to illuminate the object with a diffused light.

2. The apparatus of claim 1, wherein the lens is sized, shaped and mounted to the tube to allow the viewer to view the object through the lens and the tube.

3. The apparatus of claim 2, wherein the lens is sized, shaped and mounted to the tube to produce a magnified image for viewing by the viewer.

4. The apparatus of claim 3, wherein the magnified image is a focused internal image within the tube, and wherein the apparatus further comprises an eyepiece lens which is sized, shaped and mounted to the tube to produce a further magnified image of the internal image for viewing by the viewer.

5. The apparatus of claim 4, wherein the further magnified image is an at least five times enlargement of an unmagnified image of the object.

6. The apparatus of claim 1, wherein the lens is sized, shaped and mounted to the tube to provide a defocused region behind the lens and within the tube wherein an image projected from the defocused region onto the object is out of focus, wherein the output end is positioned within the defocused region.

7. The apparatus of claim 1, wherein the tube has a side wall and wherein the at least one optical fiber enters the tube through the side wall.

8. The apparatus of claim 7, wherein the at least one optical fiber is flexible.

9. The apparatus of claim 8, wherein the at least one optical fiber bends to orient the output end to directly project light along an uninterrupted straight path to the lens to illuminate the object.

10. An apparatus for viewing an object by a viewer comprising:
    A. a hollow tube to allow viewing of the object, the tube having a lower end and an upper end;
    B. an objective lens mounted to the lower end of the tube, the objective lens producing a focused magnified internal image within the tube;
    C. an eyepiece lens mounted to the upper end of the tube, the eyepiece lens acting to magnify the internal image for viewing by the viewer;
    D. a light source; and
    E. at least one flexible optical fiber having an input end and an output end, the input end positioned to receive light from the light source, and the output end positioned within the tube so as to directly project light along a straight path to the lens to illuminate the object, such that the path of projected light is uninterrupted and free of light-deflecting elements, wherein the output end is positioned relative to the objective lens so that the light projected onto the object by the output end is not focused, so as to illuminate the object with a diffused light.

11. The apparatus of claim 10, wherein the objective lens is sized, shaped and mounted to the tube to provide a defocused region behind the lens and within the tube wherein an image projected from the defocused region onto the object is out of focus, and wherein the output end is positioned within the defocused region.

12. The apparatus of claim 11, wherein the objective lens has a pupil plane behind the objective lens and the output end is positioned substantially at the pupil plane.

13. The apparatus of claim 10, wherein the light source is remote from the hollow tape.

14. The apparatus of claim 10, wherein the at least one flexible optical fiber is held in position within the apparatus by at least one adjustable support attached to the tube, such that the position of the output end can be varied.

15. The apparatus of claim 14, wherein the adjustable support is comprised of a deformable material.

16. The apparatus of claim 10, wherein the at least one flexible optical fiber comprises a plurality of flexible optical fibers.

17. The apparatus of claim 10, wherein said light source is a laser.

18. The apparatus of claim 10, wherein said light source is a light emitting diode.

19. The apparatus of claim 10, further comprising at least one optical filter mounted between the light source and the input end.

20. An apparatus for viewing an object by a viewer comprising:
    A. a hollow tube to allow viewing of the object, the tube having a lower end and an upper end;
    B. an objective lens mounted to the lower end of the tube, the objective lens producing a focused magnified internal image within the tube;
    C. an eyepiece lens mounted to the lower end of the tube, the eyepiece lens acting to magnify the internal image for viewing by the viewer;
    D. a light source;
    E. at least one flexible optical fiber having an input end and an output end, the input end positioned to receive light from the light source, and the output end positioned within the tube so as to directly project light along a straight path to the lens to illuminate the object, such that the path of projected light is uninterrupted and free of light deflecting elements, wherein the at least one flexible optical fiber is held in position within the apparatus by at least one adjustable support attached to the tube, such that the position of the output end can be varied, wherein the adjustable support is comprised of a deformable material; and
    F. at least one adjustment arm connected to the at least one adjustable support, whereby the position of the output end can be varied by moving the adjustment arm.

21. An apparatus for viewing an object by a viewer comprising:
    A. a hollow tube to allow viewing of the object, the tube having a lower end and an upper end;
    B. a detachable microscope objective mounted to the lower end of the tube, the microscope objective having an objective lens, the objective lens producing a focused magnified internal image within the tube, the objective lens being sized, shaped and mounted to the tube to provide a defocused region between the lens and the focused magnified internal image within the tube, such that an image projected from the defocused region onto the object is out of focus, so as to illuminate the object with a diffused light;

C. a eyepiece lens mounted to the upper end of the tube which magnifies the internal image for viewing by the viewer;

D. a remote light source; and

E. at least one flexible optical fiber having an input end and an output end, the input end positioned to receive light from the remote light source, the output end being positioned within the defocused region so as to directly project light along a straight path to the lens to illuminate the object, such that the path of projected light is uninterrupted and free of light-deflecting elements.

22. The apparatus of claim 21, wherein the at least one flexible optical fiber passes into the apparatus at the microscope objective and the at least one flexible optical fiber is mounted to the microscope objective such that the output end is positioned to project light through the objective lens and onto the object.

23. The apparatus of claim 22, wherein the at least one flexible optical fiber further comprises a plug separating a first portion of the fiber from a second portion of the fiber, the plug allowing transmission of light from the first portion to the second portion of the fiber, the plug being positioned at or near where the fiber passes though the microscope objective, such that the first portion of the fiber may be separated from the second portion to facilitate easy attachment of the microscope objective and to allow use of other microscope objectives.

24. An apparatus for viewing an object by a viewer comprising:

A. a hollow tube;

B. a lens mounted to the tube;

C. a light source;

D. an adjustable support;

E. an optical fiber mounted to the adjustable support, the optical fiber having an input end and an output end, the input end positioned to receive light from the light source, and the output end positioned within the tube so as to directly project light along a straight path to the lens to illuminate the object, whereby the path of projected light is uninterrupted and free of light-deflecting elements; and F. an adjustment arm attached to the adjustable support for varying the position of the optical fiber.

25. The apparatus of claim 24, wherein the output end is postioned relative to the lens such that light projected onto the object by the output end is not focused.

* * * * *